United States Patent [19]

Huizinga

[11] 3,782,331
[45] Jan. 1, 1974

[54] TRANSPARENT SHEET

[76] Inventor: Ebe Huizinga, 35, De Kromte, Drachten, Netherlands

[22] Filed: Mar. 3, 1972

[21] Appl. No.: 231,602

[30] Foreign Application Priority Data
Mar. 10, 1971 Netherlands................... 7103168

[52] U.S. Cl.............. 119/5, 220/4 R, 287/189.36 H
[51] Int. Cl............................................ A01k 64/00
[58] Field of Search................... 119/5; 220/4 R, 6, 220/7, 75, 82 R, 80; 264/260, 261; 217/65; 287/189.36 H, 20.92 D

[56] References Cited
UNITED STATES PATENTS
3,651,975  3/1972  Callan................. 119/5 X
3,261,493  7/1966  Smith.................. 220/80 X
3,658,035  4/1972  Harris.................. 119/5
3,561,633  2/1971  Morrison et al........ 220/4 R Primary Examiner—Louis G. Mancene
Assistant Examiner—J. N. Eskovitz
Attorney—J. Gibson Semmes

[57] ABSTRACT

A transparent sheet, particularly a glass plate, which may form part of a receptacle, in particular an aquarium, comprising a bottom plate and marginal profiles, in which the glass plates are interconnected via sealing material, whereas the edges of the plates are surrounded by profiles obtained by spraying plastics or elastomer material (consisting a.o. of silicon rubber, thermoplastic etc.), the spray-edged profiles being sealingly interconnected thereby.

5 Claims, 4 Drawing Figures

PATENTED JAN 1 1974 3,782,331

TRANSPARENT SHEET

BACKGROUND OF THE INVENTION

My invention relates to a transparent sheet, particularly a glass plate.

More particularly my invention relates to a receptacle particularly an aquarium comprising a bottom plate and marginal sections and the above mentioned transparent sheets, particularly glass plates, which are interconnected via sealing material.

Such a receptacle, particularly an aquarium, is commonly known. The transparent plates, in the shape of glass plates, are interconnected at the angular points by sealing means. As sealing means silicon rubber on an acetic acid base is generally used. These connections are, however, very vulnerable at the corners, little flexible, and owing to the small area of adhesion of the silicon rubbers, seldom waterproof.

Owing to the aforementioned points such aquariums often show deficiencies directly after placing the same. It is clear that this gives rise to many complaints.

It goes without saying that one can possibly use other sealing means, but those have mostly the drawback that after a lapse of time they become rather hard, show signs of cracking and as a consequence give rise to leakage.

Although the sections of such aquariums and the bottom plate are often made of plastic instead of metal, the problems as identified above concerning poor flexibility of the angular connections and the vulnerability of these connections resulting therefrom, remain.

SUMMARY OF THE INVENTION

It is now an object of the invention to obviate these difficulties and to provide transparent sheets and a receptacle comprising said sheets of the type mentioned before, not showing the inconveniences referred to.

This object is attained according to the invention by the arrangement, that edges of the transparent sheets are encased in sections consisting of sprayed-on plastics or elastomer profiles. The sprayed-on sections may be sealingly interconnected.

By spraying glass sheets, particularly glass panels with spray-edged profiles consisting of plastics or elastomers eventual leakage between these spray-edges profiles and the glass sheets, from the inner side of an aquarium in filled condition towards the outer side, can be entirely prevented.

On the other hand excellent connections can be obtained when such spray-edged profiles of plastic or elastomer are interconnected. This can, e.g., be effected by heatsealing, vulcanizing, curing, but also by means of glues on the base of elastomers or plastics compatible with the material of the spray-edged profiles and adhering well thereto and/or forming an integral part thereof. Due to the interconnection of the profiles obtained by spraying the aforementioned materials around the edges of the glass panels a perfect sealing is ensured. Contrary to the known construction the way to be covered by the water in order to get out of an aquarium is very long. On the other hand the joint between the plastic profiles at the angular points is very strong, since at that location great surfaces of the profiles can co-operate.

Another important advantage is in that the angular points there is only a small risk of glass splintering off, which with the known aquariums give often rise to leakage.

The profiles to be sprayed around the edges of the glass panels consist advantageously of silicon rubber, while the interconnection of the profiles is obtained by means of a glue co-operating well therewith and adhering well thereto. It is however, obvious that self-vulcanizing glues could be employed as well, which unite with the profiles obtained by spraying the aforementioned materials around the edges of the glass panels.

Instead of elastomers like silicon rubbers also thermoplastics can be used, which are well adapted to be applied at rather low temperatures around transparent glass panels or sheets. The abovementioned sheets are very suitable for application in the receptacles mentioned above but also in show boxes, racks, green houses and the like. The sheets as mentioned before may be applied in the shape of building boards and simply be disposed without risk of damage to the edges, which is particularly advantageous when glass plates are used.

SURVEY OF THE DRAWINGS

DESCRIPTION OF PREFERRED EMBODIMENTS

Figure 1:
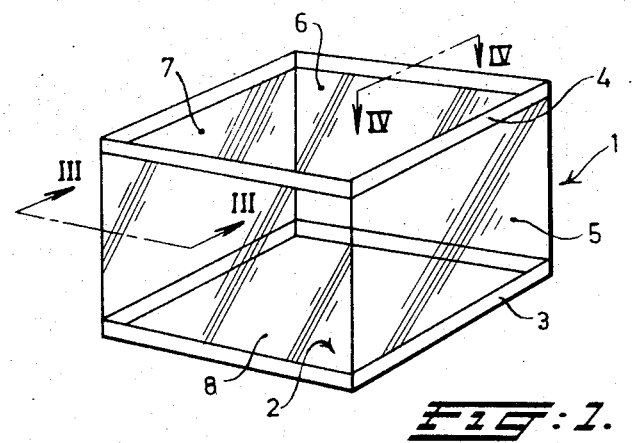
FIG. 1 shows in outline an aquarium comprising glass plates according to the invention.
Figure 2:
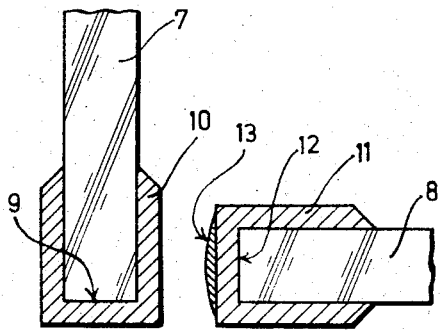
FIG. 2 represents two glass plates provided with a spray-edged profile and thereinbetween putty, glue or silicon rubber.
Figure 3:
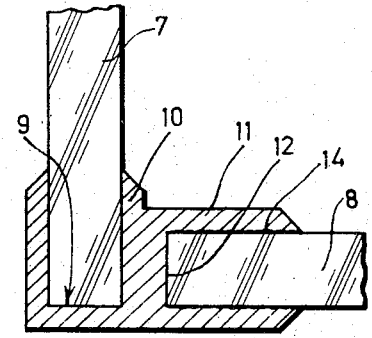
FIG. 3 represents a ready angular connection obtained by interconnecting the glass plates.
Figure 4:
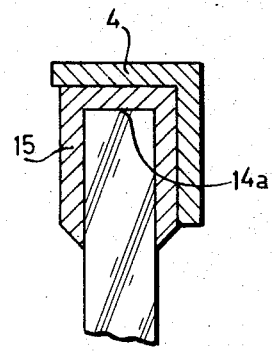
FIG. 4 is a section according to the line IV—IV.

In FIG. 1 is shown an aquarium 1 comprising a bottom plate 2, e.g., consisting of plastic, metal or glass which bottom plate is received in a metal edge 3, while at the upper end of the aquarium, that is to say, on the open side an identical metal edge 4 is provided. Instead of the metal edge a plastic edge can also be used, particularly a profiled strip of hard polyvinylchloride. By sealing together such profiled parts, the desired lower edge 3 and upper edge 4 can be obtained.

When a bottom plate 2 of hard polyvinylchloride is used the edge, likewise consisting of a thermoplastic material, can be simultaneously sealed together.

Transparent glass panels 5, 6, 7 and 8 are provided between the lower edge 3 and the upper edge 4.

In order to connect, e.g., a glass panel 7 with a glass panel 8 one proceeds as follows:

A profile denoted by the reference numeral 10 is sprayed around the edge 9. This plastic profile is, e.g., obtained by spraying a silicon rubber layer around the edge 9 disposed in a die. In this way an absolutely liquid proof sealing is obtained between the section 10 and the edge 9, since the silicon rubber has a certain etching effect which assists in establishing an excellent waterproof connection between the edge 9 and the section 10.

A profile 11 which may be of the same material as the profile 10 is likewise sprayed around the edge 11 of the glass plate 9. A different material can, however, also be used. In the present case the profiles 10 and 11 were made of a silicon rubber.

After solidification of the spray-edged profiles 10 and 11, a layer of putty or glue or silicon rubber 13 is applied to one of the profiles 10 or 11. On pressing the profiles 10 and 11 against each other an excellent connection between the panel 8 and the panel 7 will be obtained, provided a proper putty or glue 13, compatible with the materials used for the profiles, is applied. The slightly etching effect on the surface of the panel 7 in the marginal area 12 is indicated by the reference numeral 14.

After the putty 13 has solidified, which in general takes 24 hours, a proper connection is obtained. When a silicon rubber is used for the spray-edged profiles and a silicon rubber as an adhesive, a spray-edged profile, constituting a unit for all glass panels is obtained.

Obviously slightly deformable materials are selected in general for the formation of the spray-edged profiles 10 and 11, since thereby a very flexible and, as a consequence, strong connection between the glass panels is ensured.

By using spray-edged profiles 10 and 11 and the adhesive 13 between the profiles 10 and 11, it is possible to obtain very long surfaces which the water should pass by in order to get out of the aquarium. In such receptacles it is also very simple to replace damaged glass plates by cutting loose the spray-edged profiles, whereupon a new panel with such a profile is disposed and this section is connected with another spray-edged profile.

Moreover, in this case the vulnerable corners are for a great part protected by the spray-edged profiles, so that the risk of the glass splintering off, damage to the glass, at the angular points and the like, is quite impossible. It is even possible to use a bottom plate of glass and to unite the same via spray-edged profiles, with the glass plates constituting the walls. In that case at first a glass receptacle is manufactured, subsequently the marginal profiles 4 are provided at the upper and lower end whereupon these profiles 4 are connected (e.g., by means of glued joints) with the spray-edged sections 5 or directly with the upper edge 4 of the glass panels.

What is claimed is:

1. A construction of rigid panels comprising:
   A. a plurality of panels of rigid material having edge portions and upper and lower surfaces;
   B. a solidified layer of elastomeric material integrally encasing at least one of the edge portions and a marginal portion of at least one of the upper and lower surfaces adjacent the edge portion of each of the plurality of panels; and
   C. a layer of adhesive joining a portion of the elastomeric material encasing the edge portion of at least one of the plurality of panels in a corner to the elastomeric material encasing the marginal portions of others of the plurality of panel.

2. The apparatus of claim 1, wherein there are at least five panels of rectangular configuration joined to form a receptacle open on one side.

3. The apparatus of claim 1, wherein the rigid material is glass; the elastomeric material is silicon rubber and the adhesive is a self-vulcanizing glue.

4. The apparatus of claim 3, wherein the elastomeric material is a thermoplastic.

5. The apparatus of claim 3, wherein the rigid material is polyvinyl chloride.

* * * * *